United States Patent
Kushnir et al.

(10) Patent No.: US 9,608,953 B1
(45) Date of Patent: *Mar. 28, 2017

(54) SYSTEMS AND METHODS FOR TRANSFERRING MESSAGE DATA

(71) Applicant: Machine Zone, Inc., Palo Alto, CA (US)

(72) Inventors: Andrey Kushnir, Sunnyvale, CA (US); Maksim Terekhin, Ulyanovsk (RU); Leonid Mosenkov, Ulyanovsk (RU)

(73) Assignee: Machine Zone, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,597

(22) Filed: Jun. 29, 2016

Related U.S. Application Data

(63) Continuation of application No. 14/885,034, filed on Oct. 16, 2015, now Pat. No. 9,397,973.

(51) Int. Cl.
| | |
|---|---|
| *G06F 15/16* | (2006.01) |
| *H04L 12/58* | (2006.01) |
| *H04L 12/825* | (2013.01) |
| *H04L 29/08* | (2006.01) |
| *G06Q 10/10* | (2012.01) |
| *G06F 12/00* | (2006.01) |

(52) U.S. Cl.
CPC .......... *H04L 51/14* (2013.01); *G06Q 10/107* (2013.01); *H04L 47/25* (2013.01); *H04L 67/2857* (2013.01)

(58) Field of Classification Search
USPC .......... 709/206–207, 223–229, 250
See application file for complete search history.

(56) References Cited

U.S. PATENT DOCUMENTS

| | | |
|---|---|---|
| 4,264,924 A | 4/1981 | Freeman |
| 5,706,331 A | 1/1998 | Wang et al. |

(Continued)

OTHER PUBLICATIONS

Int'l Search Report and Written Opinion of the ISA/EP in PCT/US2016/022316; Jun. 1, 2016; 11 pgs.

(Continued)

*Primary Examiner* — Zarni Maung
(74) *Attorney, Agent, or Firm* — Goodwin Procter LLP

(57) ABSTRACT

Methods, systems, and apparatus, including computer programs encoded on a computer storage medium, are described for providing messages to client devices. In certain examples, a stream of messages is provided to a messaging application on a client device at a desired message feed rate. A message download rate of the stream of messages by the messaging application is monitored. A determination is made that the message download rate is less than the desired message feed rate. In response, the stream of messages is provided to a buffer on the client device at the desired message feed rate, and the stream of messages is sent from the buffer to the messaging application at the message download rate. A determination is made that the message download rate is greater than the desired message feed rate and, in response, a stored quantity of messages on the buffer is allowed to decrease. A determination is made that the stored quantity of messages on the buffer is zero and, in response, the stream of messages is provided to the messaging application at the desired message feed rate.

25 Claims, 11 Drawing Sheets

(56) References Cited

U.S. PATENT DOCUMENTS

| | | | |
|---|---|---|---|
| 5,878,228 | A | 3/1999 | Miller et al. |
| 6,208,691 | B1 | 3/2001 | Balakrishnan et al. |
| 6,549,959 | B1 | 4/2003 | Yates et al. |
| 7,047,394 | B1 | 5/2006 | Van Dyke et al. |
| 7,065,633 | B1 | 6/2006 | Yates, Jr. et al. |
| 7,376,092 | B2 | 5/2008 | Yajnik et al. |
| 7,613,813 | B2 | 11/2009 | Hussain et al. |
| 7,668,908 | B2 | 2/2010 | Kakivaya et al. |
| 7,676,580 | B2 | 3/2010 | Hill et al. |
| 7,774,720 | B1 | 8/2010 | Demetriades et al. |
| 7,917,124 | B2 | 3/2011 | D'Angelo |
| 7,929,562 | B2 | 4/2011 | Petrovykh |
| 7,941,448 | B2 | 5/2011 | Eslambolchi et al. |
| 7,970,828 | B2 | 6/2011 | Carmeli et al. |
| 7,970,918 | B2 | 6/2011 | Thompson et al. |
| 8,051,140 | B2 | 11/2011 | Lum et al. |
| 8,065,384 | B2 | 11/2011 | Plewnia et al. |
| 8,065,504 | B2 | 11/2011 | Yates, Jr. et al. |
| 8,074,055 | B1 | 12/2011 | Yates, Jr. et al. |
| 8,086,672 | B2 | 12/2011 | Horvitz |
| 8,121,828 | B2 | 2/2012 | Yates, Jr. et al. |
| 8,375,095 | B2 | 2/2013 | Yurkovich et al. |
| 8,392,555 | B2 | 3/2013 | Gale et al. |
| 8,429,702 | B2 | 4/2013 | Yasrebi et al. |
| 8,441,965 | B2 | 5/2013 | Jazra |
| 8,489,674 | B2 | 7/2013 | Srivastava et al. |
| 8,539,359 | B2 | 9/2013 | Rapaport et al. |
| 8,799,213 | B2 | 8/2014 | Wong et al. |
| 8,850,015 | B2 | 9/2014 | Finn |
| 8,850,490 | B1 | 9/2014 | Thomas et al. |
| 8,856,202 | B2 | 10/2014 | McCabe et al. |
| 8,886,731 | B2 | 11/2014 | Gunawardena et al. |
| 8,898,293 | B2 | 11/2014 | Raleigh et al. |
| 8,965,409 | B2 | 2/2015 | Abhyanker |
| 9,215,261 | B2 | 12/2015 | Marcus |
| 9,270,944 | B2 | 2/2016 | Brooks et al. |
| 9,319,363 | B1 | 4/2016 | Walkin et al. |
| 9,319,365 | B1 | 4/2016 | Milyakov |
| 9,397,973 | B1* | 7/2016 | Kushnir ............... H04L 51/14 |
| 2002/0016851 | A1 | 2/2002 | Border |
| 2004/0083264 | A1 | 4/2004 | Veselov |
| 2004/0139166 | A1 | 7/2004 | Collison |
| 2004/0139309 | A1 | 7/2004 | Gentil et al. |
| 2004/0167932 | A1 | 8/2004 | Edmonds |
| 2005/0021622 | A1 | 1/2005 | Cullen |
| 2005/0262205 | A1 | 11/2005 | Nikolov et al. |
| 2006/0036679 | A1 | 2/2006 | Goodman et al. |
| 2006/0149787 | A1 | 7/2006 | Surlaker et al. |
| 2007/0013948 | A1 | 1/2007 | Bevan |
| 2008/0016198 | A1 | 1/2008 | Johnston-Watt et al. |
| 2008/0235366 | A1 | 9/2008 | Telfer |
| 2009/0037514 | A1 | 2/2009 | Lankford et al. |
| 2010/0251262 | A1 | 9/2010 | Rokicki et al. |
| 2011/0179162 | A1 | 7/2011 | Mayo |
| 2012/0023116 | A1 | 1/2012 | Wilkes et al. |
| 2012/0197990 | A1 | 8/2012 | Li et al. |
| 2012/0278728 | A1 | 11/2012 | Malin et al. |
| 2012/0284756 | A1 | 11/2012 | Kotecha et al. |
| 2013/0031162 | A1 | 1/2013 | Willis et al. |
| 2013/0081060 | A1 | 3/2013 | Otenko |
| 2013/0159472 | A1 | 6/2013 | Newton et al. |
| 2013/0254314 | A1 | 9/2013 | Chow |
| 2014/0082085 | A1 | 3/2014 | Krishnaprasad et al. |
| 2014/0226713 | A1 | 8/2014 | Perlman et al. |
| 2014/0237057 | A1 | 8/2014 | Khodorenko |
| 2014/0310369 | A1 | 10/2014 | Makhervaks et al. |
| 2014/0372489 | A1 | 12/2014 | Jaiswal et al. |
| 2014/0372755 | A1 | 12/2014 | Ristock et al. |
| 2015/0012598 | A1 | 1/2015 | Klimt |
| 2015/0100664 | A1 | 4/2015 | Flack et al. |
| 2015/0207851 | A1 | 7/2015 | Nampally |
| 2015/0262151 | A1 | 9/2015 | Enzminger et al. |
| 2015/0317676 | A1 | 11/2015 | Reid et al. |
| 2016/0072865 | A1 | 3/2016 | Kaplinger et al. |
| 2016/0219089 | A1 | 7/2016 | Murthy et al. |
| 2016/0261480 | A1 | 9/2016 | Agarwal et al. |
| 2016/0285986 | A1 | 9/2016 | Mokhtari et al. |

OTHER PUBLICATIONS

Corsaro, A., et al., "Quality of Service in Publish/Subscribe Middleware," IOS Press; pp. 1-19; 2003.

Vahdat, A. and Becker, D., "Epidemic Routing for Partially-Connected Ad Hoc Networks," Duke University; 14pgs.; Jul. 2000.

Zeidler, et al., "Mobility Support with REBECA," Proc. 23rd Int'l Conference on Distributed Computing Systems Workshops; May 19-22, 2003; 5pgs.

"Cloud Pub/Sub," accessed on the internet at: https://cloud.google.com/pubsub/overview; downloaded Aug. 7, 2015; 5pgs.

"Publish-subscribe pattern"; accessed on the internet at: https://en.wikipedia.org/wiki/Publish%E2%80%93subscribe_pattern; downloaded Aug. 7, 2015; 4pgs.

"Welcome to PyPubSub's Home Page!," accessed on the internet at: http://pubsub.sourceforge.net/; downloaded Aug. 7, 2015; 2pgs.

U.S. Appl. No. 14/821,416, filed Aug. 7, 2015, Scalable, Real-Time Messaging System, Walkin, et al.

U.S. Appl. No. 14/821,421, filed Aug. 7, 2015, Scalable, Real-Time Messaging System, Walkin, et al.

U.S. Appl. No. 15/067,476, filed Mar. 11, 2016, Scalable, Real-Time Messaging System, Walkin, et al.

U.S. Appl. No. 15/175,588, filed Jun. 7, 2016, Message Compression in Scalable Messaging System, Walkin.

U.S. Appl. No. 15/063,390, filed Mar. 7, 2016, Systems and Methods for Storing and Transferring Message Data, Milyakov.

U.S. Appl. No. 14/879,661, filed Oct. 9, 2015, Systems and Methods for Storing Message Data, Hafri.

U.S. Appl. No. 14/885,034, filed Oct. 16, 2015, Systems and Methods for Transferring Message Data, Kushnir, et al.

U.S. Appl. No. 15/155,384, filed May 16, 2016, Maintaining Persistence of a Messaging System, Kushnir, et al.

U.S. Appl. No. 62/313,594, filed Mar. 25, 2016, Pub-Sub Application Programming Interface, Walkin.

Chakravarthy, S. and Vontella, N., "A Publish/Subscribe Based Architecture of an Alert Server to Support Prioritized and Persistent Alerts," Lecture Notes in Computer Science; 3347:1-6-116; Jan. 2004.

Int'l Search Report and Written Opinion of the ISA/EP in PCT/US2016/023164; Jul. 11, 2016; 15pgs.

U.S. Appl. No. 15/244,380, filed Aug. 23, 2016, Scalable, Real-Time Messaging System, Walkin, et al.

U.S. Appl. No. 15/274,281, filed Sep. 23, 2016, Systems and Methods for Providing Messages to Multiple Subscribers, Milyakov.

U.S. Appl. No. 15/252,989, filed Aug. 31, 2016, Data Replication in Scalable Messaging System, Hafri, et al.

U.S. Appl. No. 15/290.695, filed Oct. 11, 2016, Systems and Methods for Storing Message Data, Hafri.

U.S. Appl. No. 15/291,633, filed Oct. 12, 2016, Systems and Methods for Storing and Transferring Message Data, Milyakov.

Cagle, K., "Convert a Text File to XML," accessed on the internet at http://www.devx.com/getHelpOn/10MinuteSolution/20356; downloaded Sep. 22, 2016; 8pgs.

Int'l Search Report and Written Opinion of the ISA/EP in PCT/US2016/039958; Oct. 4, 2016; 11 pgs.

* cited by examiner

SYSTEMS AND METHODS FOR TRANSFERRING MESSAGE DATA

CROSS-REFERENCE TO RELATED APPLICATIONS

This application is a continuation of and claims priority from U.S. patent application Ser. No. 14/885,034, filed on Oct. 16, 2015, the disclosure of which is hereby incorporated by reference in its entirety.

BACKGROUND

This specification relates to a data communication system and, in particular, a system that implements real-time, scalable publish-subscribe messaging.

The publish-subscribe pattern (or "PubSub") is a data communication messaging arrangement implemented by software systems where so-called publishers publish messages to topics and so-called subscribers receive the messages pertaining to particular topics that are subscribed to. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases. Further, existing Pubsub systems may attempt to process as many events and messages as possible on the client device. This leads to performance degradation when the flow of messages is too high for the client device.

SUMMARY

Examples of the systems and methods described herein are used to process messages and other data received at client devices of users. In instances when a messaging application on a client device is unable to keep up with a rate at which messages are received on the client device, the messages are diverted to a buffer on the client device. The buffer then forwards the messages to the messaging application, preferably in an order in which the messages were received. The buffer stores the message data temporarily and sends the messages to the messaging application at a rate the messaging application is able to handle (e.g., a maximum download rate for the messaging application). In general, the buffer accumulates message data when the buffer receives messages faster than the messages are forward from the buffer to the messaging application. Likewise, the buffer stores fewer messages when the buffer receives messages at a lower rate than the messages are forwarded from the buffer to the messaging application. Accordingly, the buffer is able to provide messages to the messaging application at a rate that is suitable for the messaging application, such that the messaging device receives messages in a proper order and at a proper rate. This avoids problems associated with prior systems in which a messaging application may receive messages too quickly and, as a result, may drop certain messages and/or crash due to overload.

In general, one aspect of the subject matter described in this specification relates to a method. The method includes performing, by one or more computers, the following steps: receiving at a client device a stream of messages from a sender; providing the stream of messages to a messaging application on the client device at a desired message feed rate associated with the sender; monitoring a message download rate of the stream of messages by the messaging application; determining that the message download rate is less than the desired message feed rate and, in response, providing the stream of messages to a buffer on the client device at the desired message feed rate, and sending the stream of messages from the buffer to the messaging application at the message download rate; determining that the message download rate is greater than the desired message feed rate and, in response, allowing a stored quantity of messages on the buffer to decrease; and determining that the stored quantity of messages on the buffer is zero and, in response, providing the stream of messages to the messaging application at the desired message feed rate.

In certain examples, the stream of messages corresponds to a single channel in a PubSub system or, alternatively, to a plurality of channels in a PubSub system. The buffer may include a plurality of buffers, and each buffer in the plurality of buffers may correspond to one channel in the plurality of channels. In various instances, the sender is or includes an MX node in a PubSub system. The desired message feed rate may correspond to a rate at which messages are published in a PubSub system. In some implementations, the download rate corresponds to a maximum rate at which the messaging application is able to download messages. The download rate may depend on, for example, a desired refresh rate for the client device.

In some examples, sending the stream of messages from the buffer to the client device may include sending messages in an order in which the messages were received by the buffer. In general, the stored quantity of messages on the buffer increases (e.g., message data accumulates on the buffer) when the desired message feed rate is greater than the message download rate. In various examples, the stored quantity of messages on the buffer decreases when the desired message feed rate is less than the message download rate.

In another aspect, the subject matter of this disclosure relates to a system that includes a non-transitory computer readable medium having instructions stored thereon. The system also includes a data processing apparatus configured to execute the instructions to perform operations that include: receiving at a client device a stream of messages from a sender; providing the stream of messages to a messaging application on the client device at a desired message feed rate associated with the sender; monitoring a message download rate of the stream of messages by the messaging application; determining that the message download rate is less than the desired message feed rate and, in response, providing the stream of messages to a buffer on the client device at the desired message feed rate, and sending the stream of messages from the buffer to the messaging application at the message download rate; determining that the message download rate is greater than the desired message feed rate and, in response, allowing a stored quantity of messages on the buffer to decrease; and determining that the stored quantity of messages on the buffer is zero and, in response, providing the stream of messages to the messaging application at the desired message feed rate.

In certain examples, the stream of messages corresponds to a single channel in a PubSub system or, alternatively, to a plurality of channels in a PubSub system. The buffer may include a plurality of buffers, and each buffer in the plurality of buffers may correspond to one channel in the plurality of channels. In various instances, the sender is or includes an MX node in a PubSub system. The desired message feed rate may correspond to a rate at which messages are published in a PubSub system. In some implementations, the download rate corresponds to a maximum rate at which the messaging application is able to download messages. The download rate may depend on, for example, a desired refresh rate for the client device.

In some examples, sending the stream of messages from the buffer to the client device may include sending messages in an order in which the messages were received by the buffer. In general, the stored quantity of messages on the buffer increases (e.g., message data accumulates on the buffer) when the desired message feed rate is greater than the message download rate. In various examples, the stored quantity of messages on the buffer decreases when the desired message feed rate is less than the message download rate.

In another aspect, the subject matter described in this specification can be embodied in a computer program product stored in one or more non-transitory storage media for controlling a processing mode of a data processing apparatus. The computer program product is executable by the data processing apparatus to cause the data processing apparatus to perform operations including: receiving at a client device a stream of messages from a sender; providing the stream of messages to a messaging application on the client device at a desired message feed rate associated with the sender; monitoring a message download rate of the stream of messages by the messaging application; determining that the message download rate is less than the desired message feed rate and, in response, providing the stream of messages to a buffer on the client device at the desired message feed rate, and sending the stream of messages from the buffer to the messaging application at the message download rate; determining that the message download rate is greater than the desired message feed rate and, in response, allowing a stored quantity of messages on the buffer to decrease; and determining that the stored quantity of messages on the buffer is zero and, in response, providing the stream of messages to the messaging application at the desired message feed rate.

In certain examples, the stream of messages corresponds to a single channel in a PubSub system or, alternatively, to a plurality of channels in a PubSub system. The buffer may include a plurality of buffers, and each buffer in the plurality of buffers may correspond to one channel in the plurality of channels. In various instances, the sender is or includes an MX node in a PubSub system. The desired message feed rate may correspond to a rate at which messages are published in a PubSub system. In some implementations, the download rate corresponds to a maximum rate at which the messaging application is able to download messages. The download rate may depend on, for example, a desired refresh rate for the client device.

In some examples, sending the stream of messages from the buffer to the client device may include sending messages in an order in which the messages were received by the buffer. In general, the stored quantity of messages on the buffer increases (e.g., message data accumulates on the buffer) when the desired message feed rate is greater than the message download rate. In various examples, the stored quantity of messages on the buffer decreases when the desired message feed rate is less than the message download rate.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
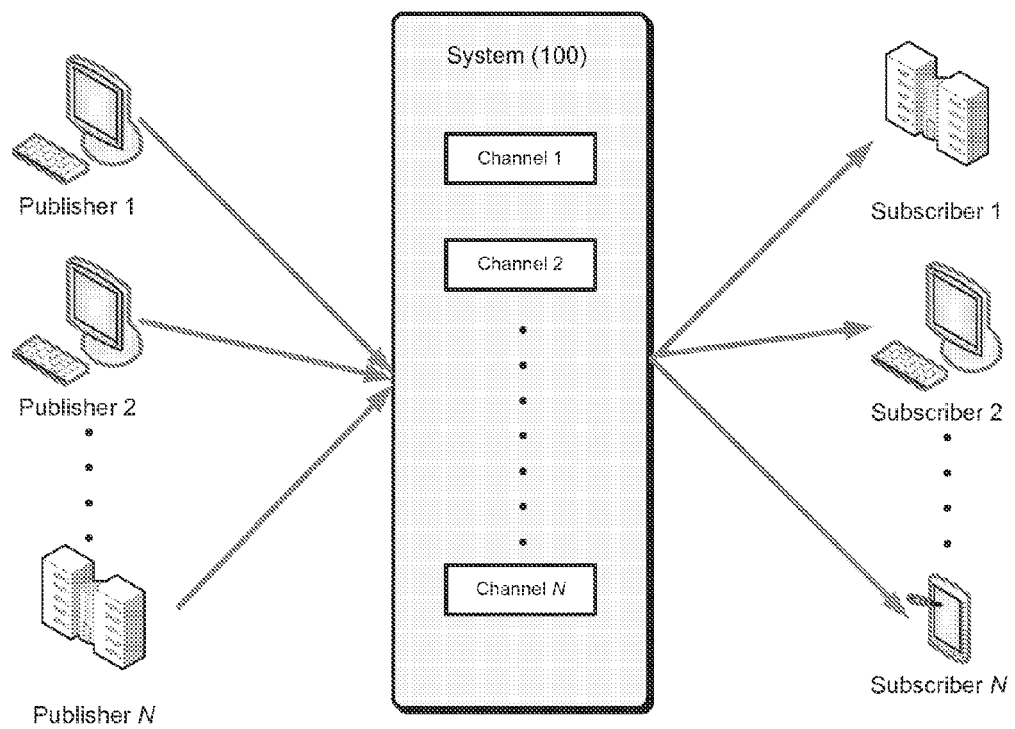
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
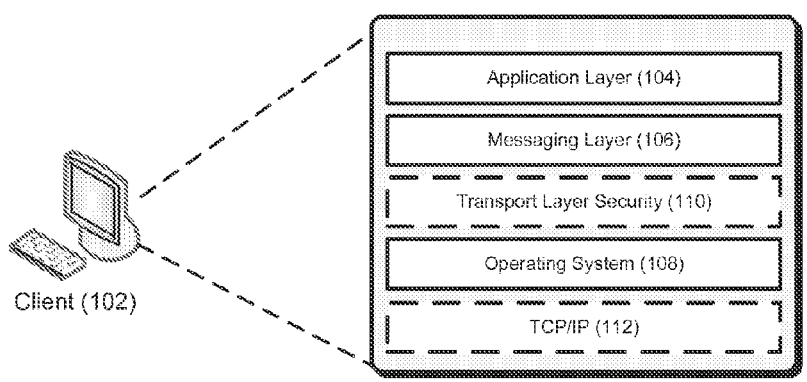
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
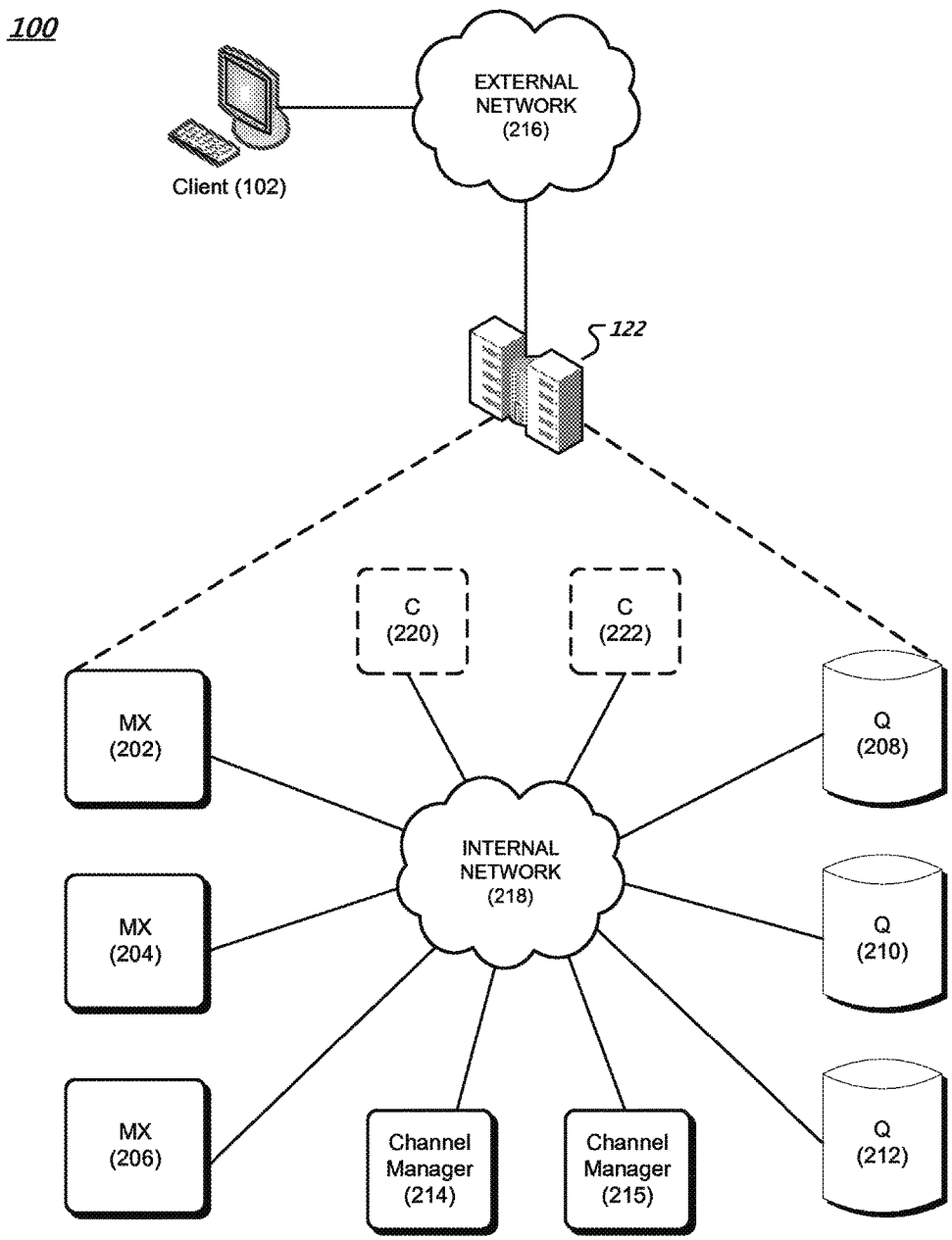
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream by time of publication by the client, by time of receipt by an MX node, or by time of receipt by a Q node. Other ways for ordering messages in a channel stream are possible. In the case where more than one message would be assigned to the same position in the order one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX 204) makes a request to a channel manager (e.g., channel manager 214) to grant access to a streamlet to write the message being published. Note, however, that if the MX node has already been granted write access to a streamlet for the channel (and the channel has not been closed to writing) the MX node can write the message to that streamlet without having to request a grant to access the streamlet. Once a message is written to a streamlet for a channel the message can be read by MX nodes and provided to subscribers of that channel.

Similarly, when receiving a channel subscription request from a client device, an MX node makes a request to a channel manager to grant access to a streamlet for the channel to read messages from. If the MX node has already been granted read access to a streamlet for the channel (and the channel's TTL has not been closed to reading) the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

StreamletGrantRequest={
"channel": string( )
"mode": "read"|"write"
"position": 0
}
StreamletGrant={
"streamlet-id": "abcdef82734987",
"limit-size": 2000000, #2 megabytes max
"limit-msgs": 5000, #5 thousand messages max
"limit-life": 4000, # the grant is valid for 4 seconds
"q-node": string( )
"position": 0
}

The streamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The streamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The streamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
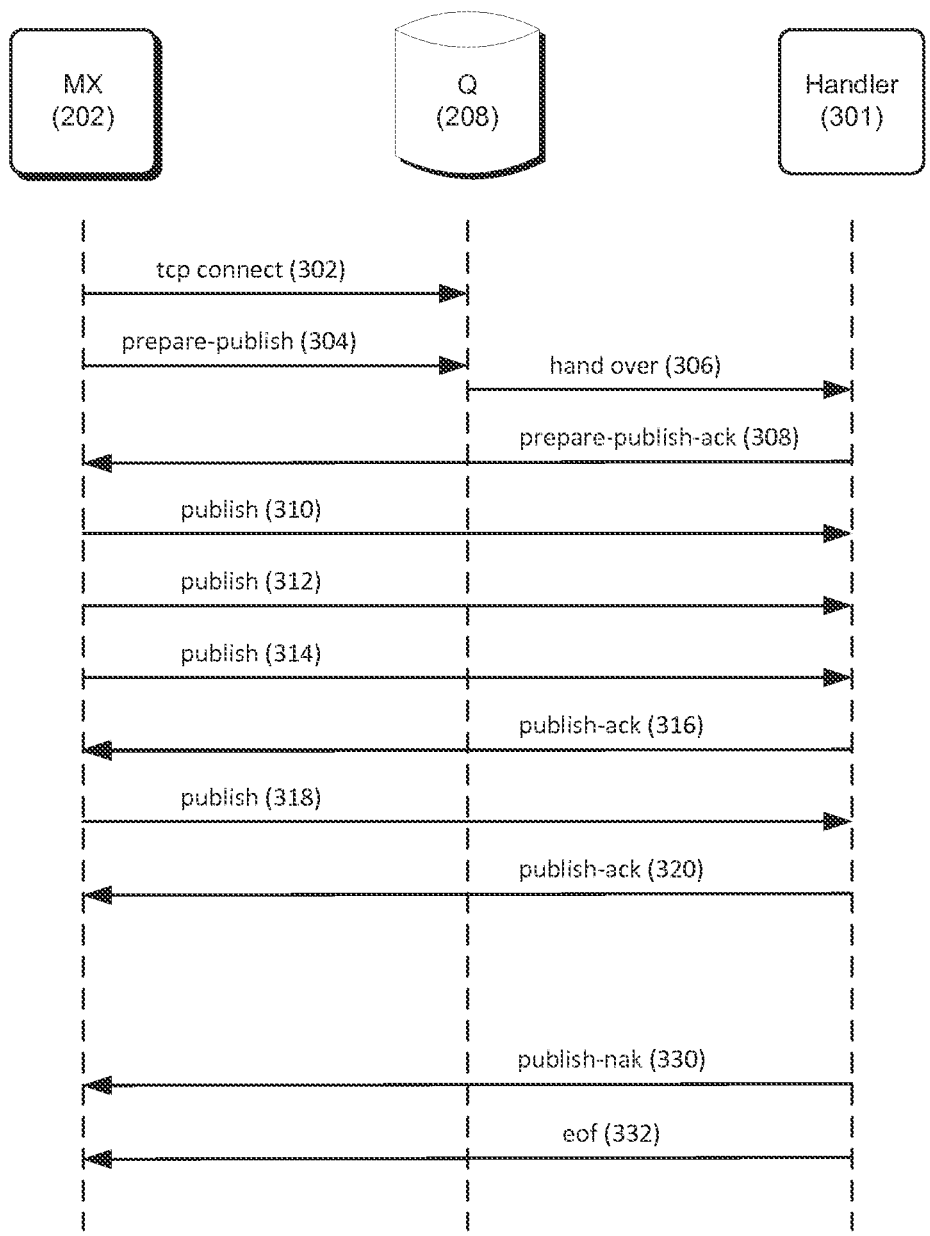
FIG. 3A is a data flow diagram of an example method for writing data to a streamlet.

FIG. 3A is a data flow diagram of an example method for writing data to a streamlet in various embodiments. In FIG. 3A, when an MX node (e.g., MX 202) request to write to a streamlet is granted by a channel manager (e.g., channel manager 214), as described before, the MX node establishes a Transmission Control Protocol (TCP) connection with the Q node identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received), or for every predetermined time period (e.g., for every one millisecond). Other acknowledgement scheduling algorithms such as Nagle's algorithm can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
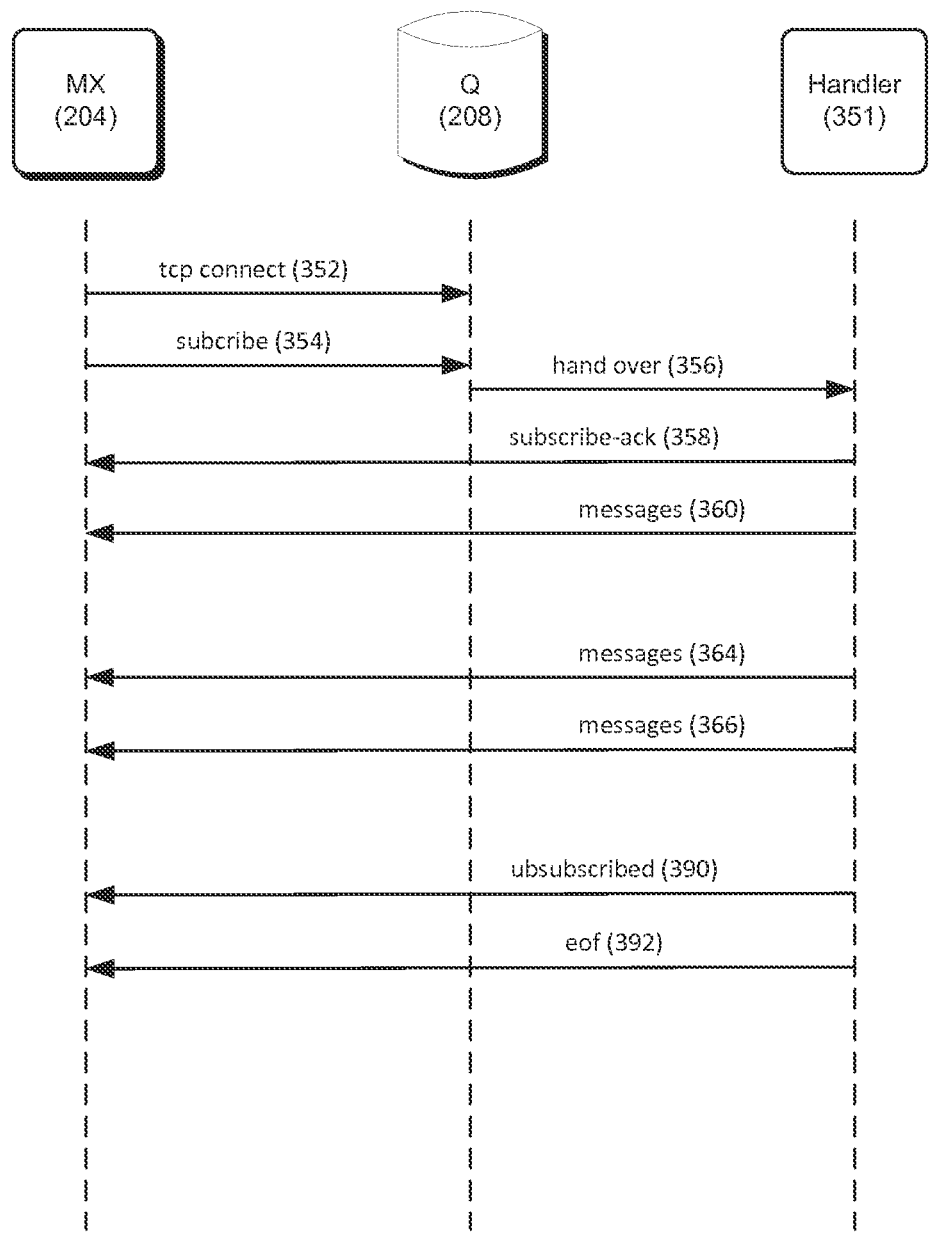
FIG. 3B is a data flow diagram of an example method for reading data from a streamlet.

FIG. 3B is a data flow diagram of an example method for reading data from a streamlet in various embodiments. In FIG. 3B, an MX node (e.g., MX 202) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message with the identifier of the streamlet (in the Q node) and the position in the streamlet that the MX node wants to read from (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, e.g., time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in registers and dynamic memory elements associated with a computing process on a Q node thus avoiding the need to access persistent, slower storage devices such as hard disks. This results in faster message access. The channel manager can also balance load among Q nodes in the messaging system 100 by monitoring respective workload of the Q nodes and allocating streamlets in a way that avoids overloading any one Q node.

In various implementations, a channel manager maintains a list identifying each active streamlet, the respective Q node on which the streamlet resides, and identification of the position of the first message in the streamlet, and whether the streamlet is closed for writing. In some implementations, Q nodes notify the channel manager and any MX nodes that are publishing to a streamlet the streamlet is closed due to being full or when the streamlet's TTL has expired. When a streamlet is closed the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrant. Otherwise the channel manager returns the identity of the currently open for writing streamlet and corresponding Q node in the StreamletGrant. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrant. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired the handler 351 sends EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols such as Paxos or Raft protocols.

In various examples, systems and methods are provided for monitoring and controlling the transfer of message data to client devices. When sending a stream of messages to a client device, the systems and methods may attempt to send the message stream at a desired message transfer rate, which may correspond to, for example, a desired refresh rate for the client device or a desired number of bytes/second. During periods of high message traffic, the client device may be unable to receive or download the message stream at the desired message transfer rate. For example, a download rate at the client device may be lower than the desired message transfer rate. In such an instance, the message stream may be diverted to a buffer which may store or accumulate message data and pass the message data along to the client device, preferably in the order in which the buffer received the message data. When the buffer receives message data faster than the buffer transfers message data to the client device (e.g., because the desired message feed rate is greater than the download rate at the client device), message data accumulates on the buffer. Likewise, when the buffer transfers message data to the client device faster than it receives message data (e.g., because the download rate at the client device is greater than the desired message feed rate), message data is removed from the buffer. When a number of messages stored on the buffer is equal to zero, messages may again be sent directly to the client device, without first being diverted to the buffer.

Figure 4A:
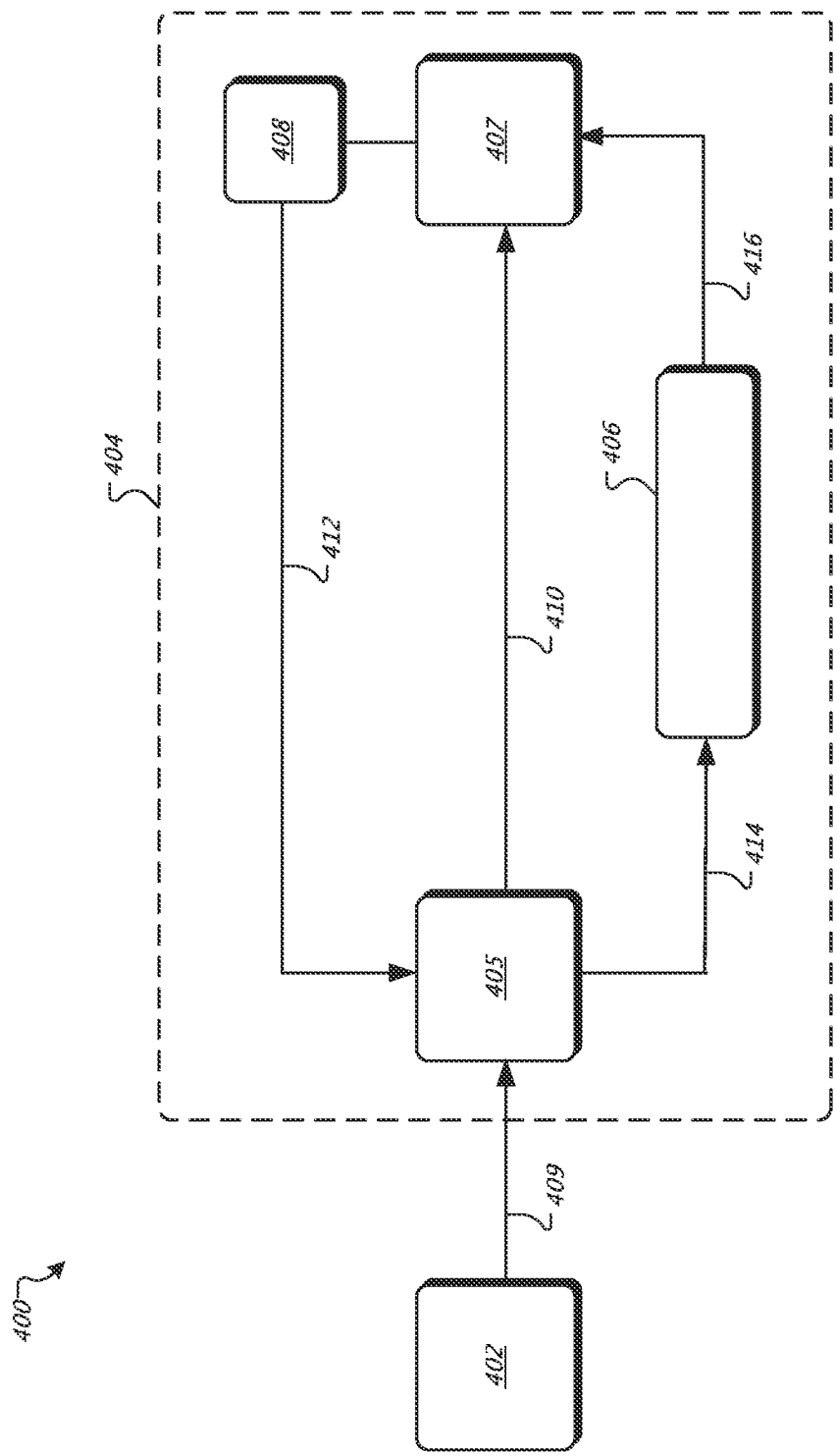
FIGS. 4A-4F are schematic diagrams of an example system for providing message data to a client device.

FIG. 4A is an example system 400 for monitoring and controlling a transfer of message data. The system 400 includes a message sender 402 for sending messages to a client device 404. The client device 404 includes a controller 405, a buffer 406, a messaging application 407, and a sensor 408. The controller 405, the buffer 406, and/or the sensor 408 are preferably implemented in software. During operation of the system 400, the sender 402 (e.g., an MX node) transfers streams of messages to the client device 404 along an input path 409 to the controller 405. The messages pass through the controller 405 and travel along primary path 410 to the messaging application 407. The sensor 408 monitors a download rate of the messages at the messaging application 407 and reports the download rate to the controller 405 along a feedback path 412.

In general, the sender 402 transfers the message streams to the client device 404 at a desired message feed rate. The desired message feed rate may be or may correspond to, for example, a rate at which the sender 402 is receiving message data to send to the client device 404. When the sender 402 receives messages at a higher rate, it may attempt to transfer the message streams to the client device 404 at a correspondingly higher rate. In this way, the desired message feed rate may fluctuate over time, according to a number of messages being processed or handled by the sender 402.

In certain instances, the messaging application 407 is unable to receive or download the message streams at the desired message feed rate. When this happens, the sensor 408, which is monitoring the download rate and capabilities of the messaging application 407, instructs the controller 405 to stop sending the messages along the primary path 410 and instead to divert the messages to the buffer 406 along a buffer input path 414. The messages are then forward from the buffer 406 to the messaging application 407, along a buffer output path 416. The buffer 406 is able to store or accumulate messages, and messages can therefore be sent from the buffer 406 to the messaging application 407 at a rate that is lower than the desired message feed rate. For example, the rate at which messages are sent from the buffer 406 to the messaging application 407 (referred to herein as a "buffer feed rate") may be equal to a maximum download rate associated with the messaging application 407 (e.g., a maximum rate at which the messaging application 407 is capable of downloading messages). This maximum download rate may be a fixed value (e.g., based on a desired refresh rate for the messaging application 407 or the client device 404) or it may vary over time. In some implementations, the maximum download rate is monitored and detected by the sensor 408.

In general, a rate at which the buffer 406 accumulates messages is a function of the desired message feed rate and the buffer feed rate. When the desired message feed rate exceeds the buffer feed rate, a number of messages stored in the buffer 406 increases. When the desired message feed rate is less than the buffer feed rate, the number of messages stored in the buffer 406 decreases.

The messaging application is preferably a software program that a user of a client device uses to view or receive message data. The messaging application may be, for example, a software program for viewing or receiving text messages, email, news feeds, images, music, video, or combinations thereof. The messaging application may be implemented on any suitable client device, including, for example, smart phones, tablet computers, personal computers, and workstations.

Figure 4B:
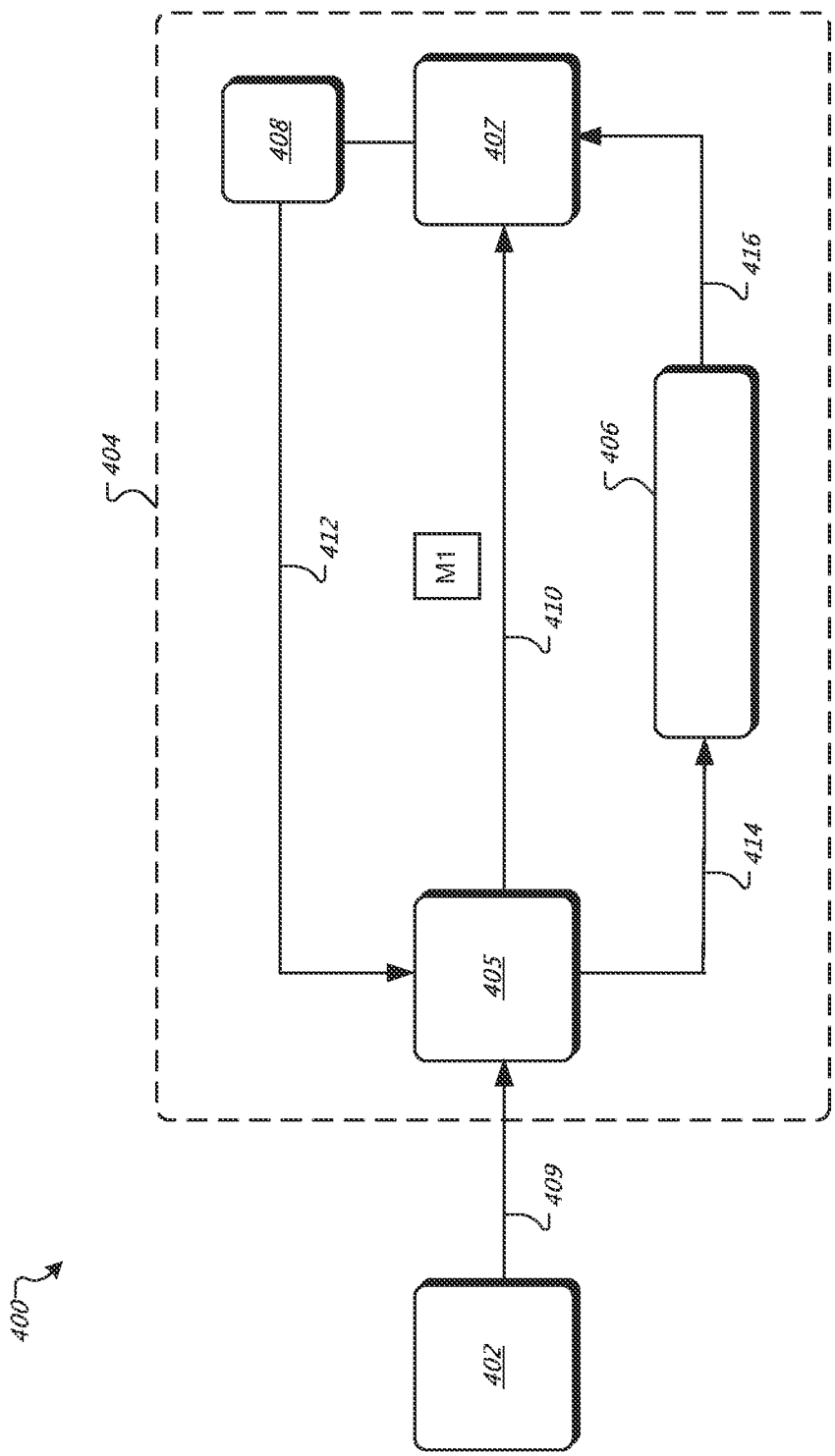

FIGS. 4B through 4F show messages being delivered along the primary path 410, the buffer input path 414, and the buffer output path 416. In the example of FIG. 4B, the controller 405 is sending a message M1 to the messaging application 407 along the primary path 410. At this instant in time, the messaging application 407 is able to download messages at a rate equal to the desired message feed rate (e.g., the desired message feed rate is less than the maximum download rate of the messaging application 407).

Figure 4C:
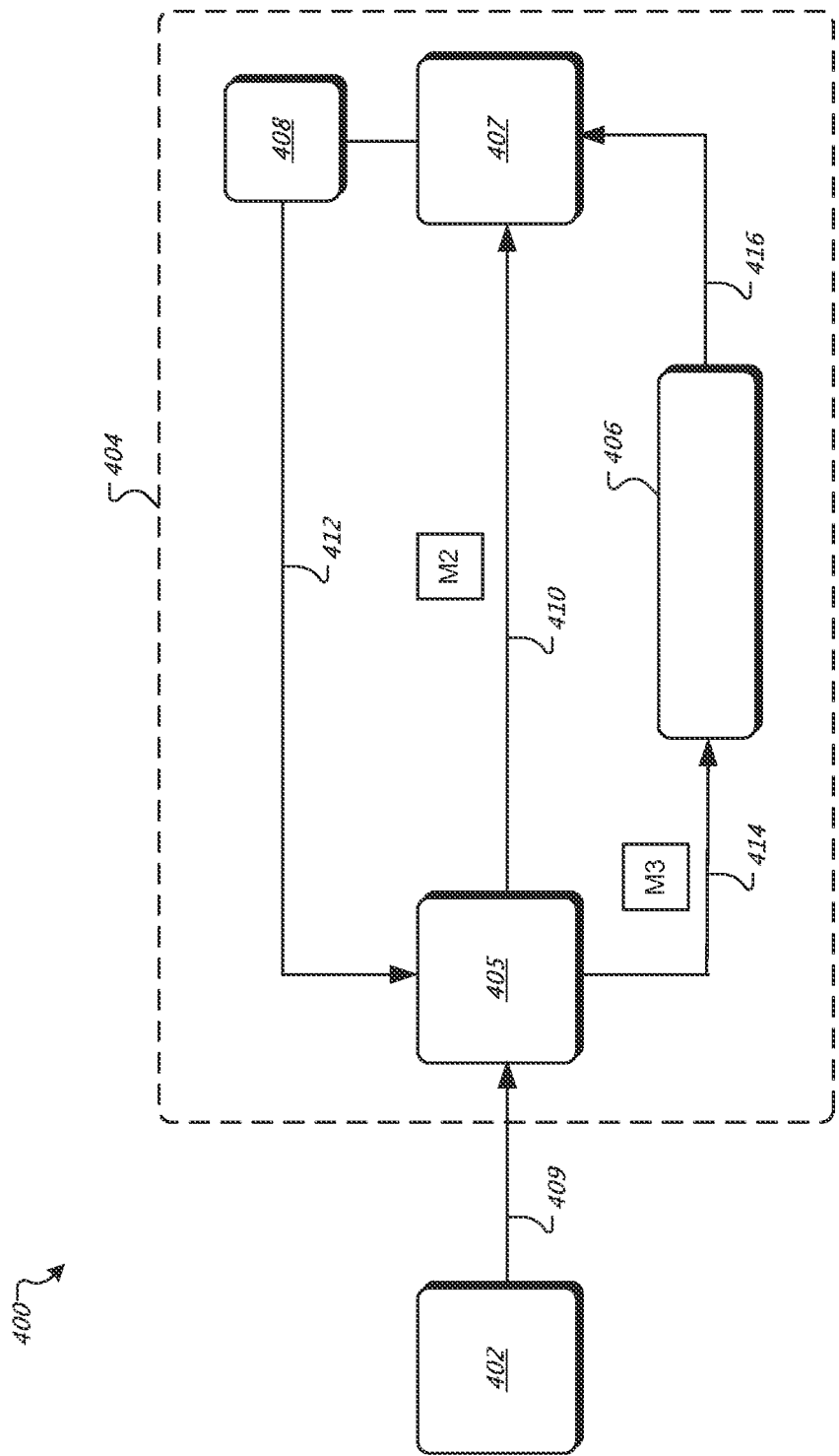

At a later time, referring to FIG. 4C, the controller 405 sends another message M2 to the messaging application 407 along the primary path 410, but the download rate of the messaging application 407 (e.g., as measured by the sensor 408) is less than the desired message feed rate. To allow the sender 402 to continue delivering messages at the desired message feed rate, the controller 405 sends a subsequent message M3 to the buffer 406, along the buffer input path 414.

Figure 4D:
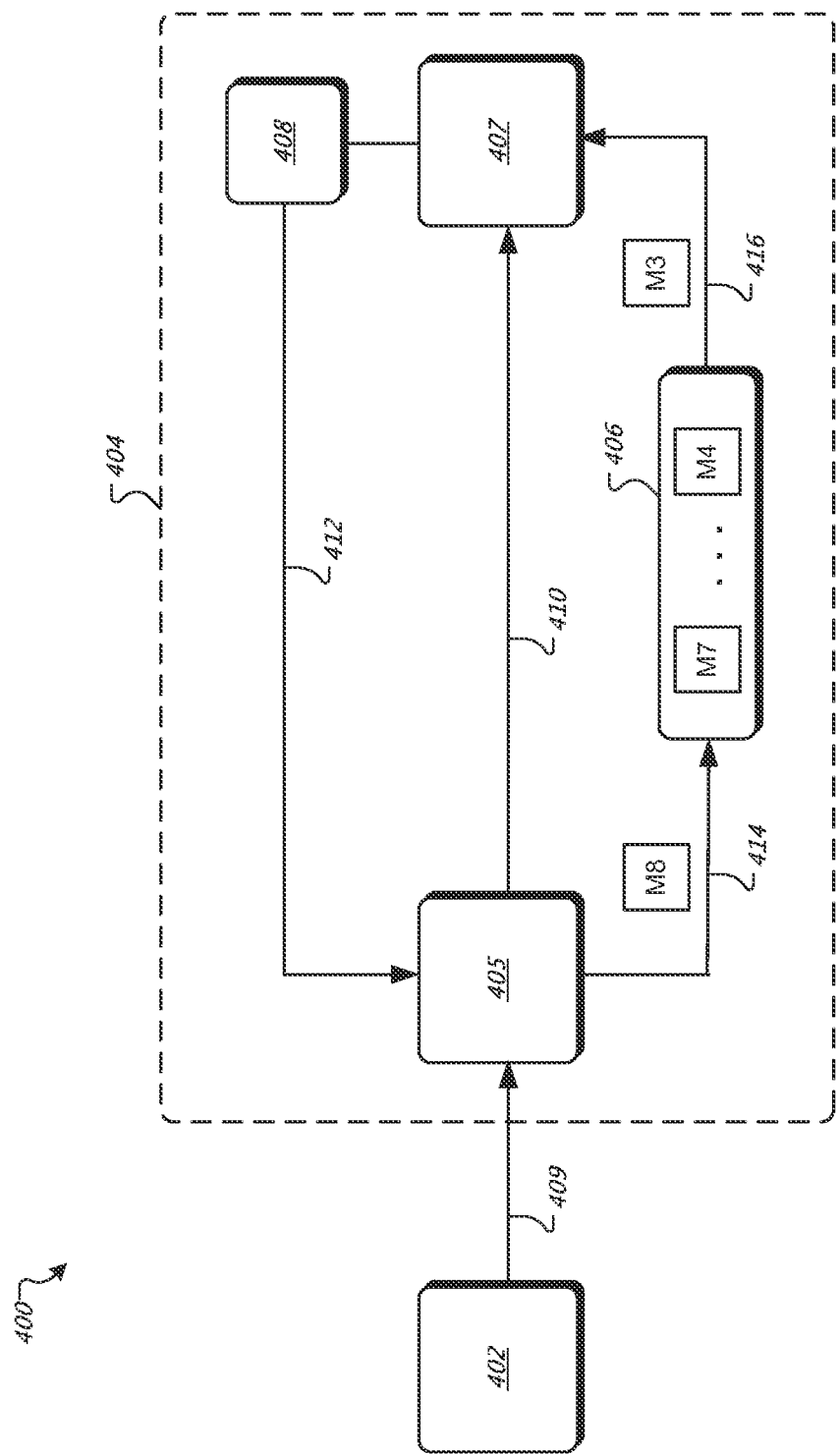

At a further instance in time, referring to FIG. 4D, the controller 405 continues to send messages to the buffer 406 along the buffer input path 414, and the messages are, in turn, forwarded from the buffer 406 to the messaging application 407 along the buffer output path 416. At this time, message M3 is being sent from the buffer 406 to the messaging application 407, and message M8 is being sent from the controller 405 to the buffer 406. The buffer 406 is also storing messages M4 through M7, which were sent from the controller 405 and received by the buffer 406 previously. The desired message feed rate at this time is greater than the download rate, and the number of messages stored on the buffer 406 is increasing.

Figure 4E:
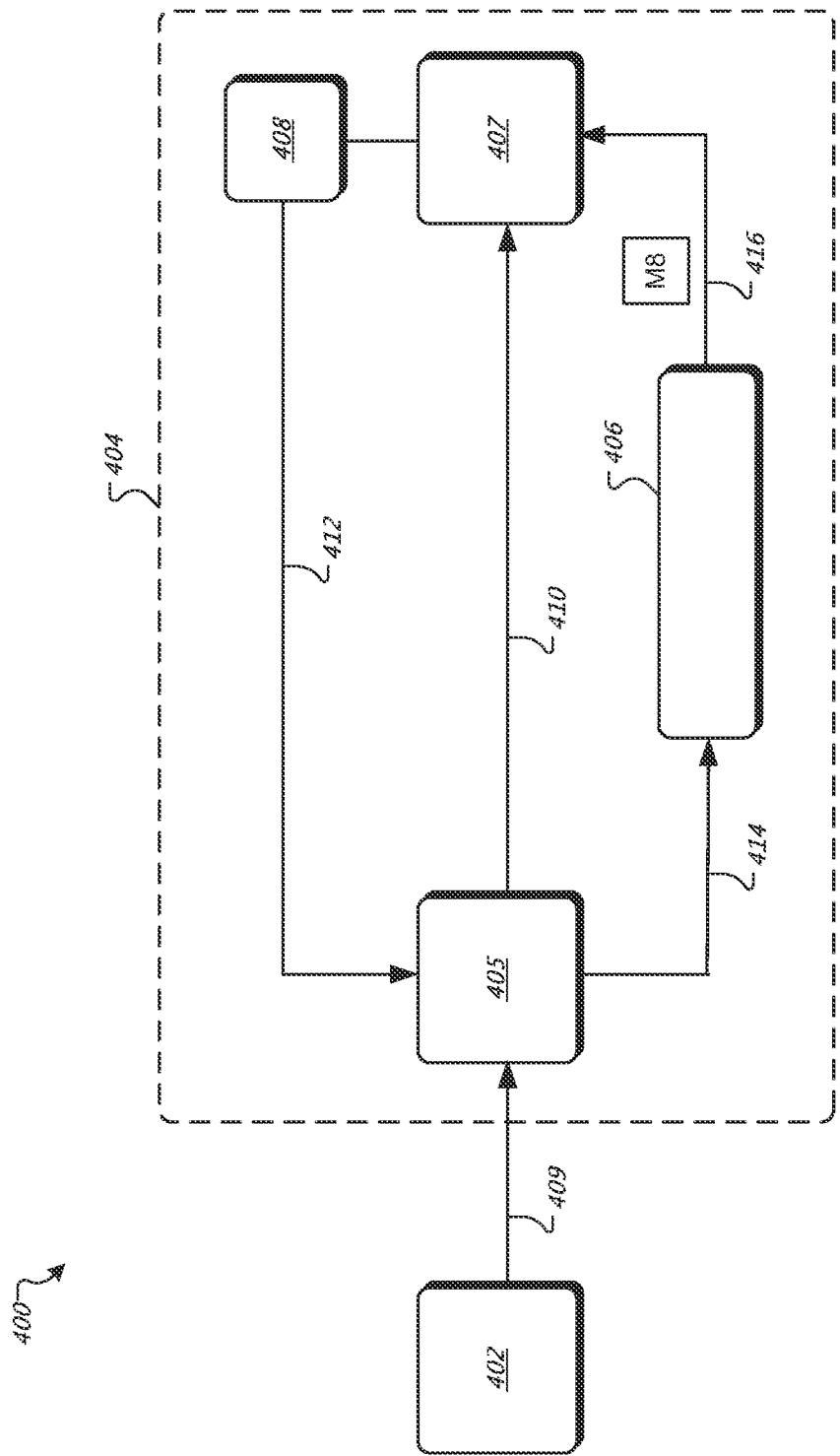
Figure 4F:
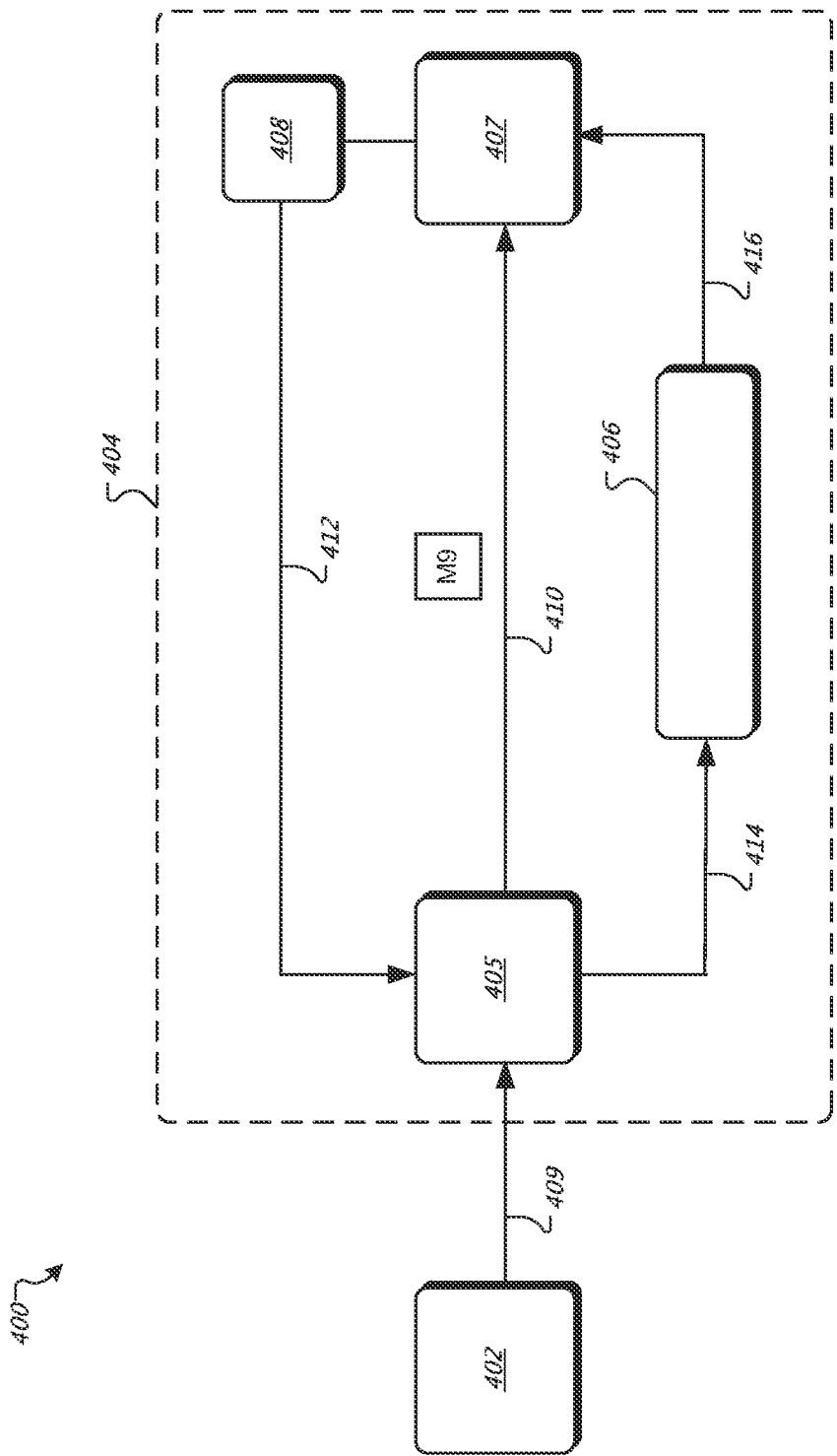

At a later time, referring to FIG. 4E, the buffer 406 is no longer storing messages and message M8 has been sent from the buffer 406 to the messaging application 407. At this time, the desired message feed rate is less than the download rate of the messaging application 407, and the number of messages stored on the buffer 406 has decreased to zero. With the buffer 406 now empty and the messaging application 407 able to download messages at the desired feed rate, the controller 405 sends a next message M9 directly to the messaging application 407 along the primary path 410, as shown in FIG. 4F.

In various implementations, the desired message feed rate is equal to the rate at which the sender 402 sends and receives messages. The sender 402, which may be an MX node or other PubSub system device, receives or obtains a stream of messages and forwards the messages to the client device 404. The rate at which the sender 402 forwards the messages may be equal to the rate at which the sender 402 receives the messages. The sender 402 preferably forwards messages in an order in which the messages were received.

In some instances, when the buffer 406 is full and the messaging application 407 is unable to receive additional messages, one or more messages (e.g., messages that have been stored by the buffer for the longest period of time) may be deleted from the buffer 406 without being sent to the messaging application 407. Deleting the messages in this manner may avoid buffer bloat.

In certain examples, the system 400 utilizes a process control scheme to obtain desired rates of message data transfer from the sender 402 to the messaging application 407. The sensor 408 monitors the download rate at the messaging application 407 and provides measured download rates to the controller 405 (e.g., along the feedback path 412) and/or one or more other components of the system 400. Likewise, the desired message feed rate is monitored by the controller 405 and/or one or more other components of the system 400. When the download rate is less than the desired message feed rate (i.e., the messaging application 407 is unable to handle a flowrate of messages it is receiving), the controller 405 or a process controller used by the system 400 (e.g., within the client device 404) diverts messages to the buffer 406, thereby relieving message input demands on the messaging application 407. The controller 405 continues to monitor the download rate and the desired message feed rate. When the buffer 406 is empty and/or no longer required to reduce the flow of messages to the client device 404, the controller 405 may resume sending messages directly to the messaging application 407 along the primary path 410 (e.g., without first passing message data through the buffer 406).

In alternative implementations, the system 400 may not include the primary path 410 and may always send messages to the messaging application 407 via the buffer 406, using the buffer input path 414 and the buffer output path 416. In this arrangement, when the desired message feed rate does not exceed the download rate, the buffer 406 may not store message data and may instead serve as a conduit through which messages are sent to the messaging application 407. The buffer 406 may store messages, as needed, when the desired message feed rate exceeds the download rate, as described herein.

Figure 5:
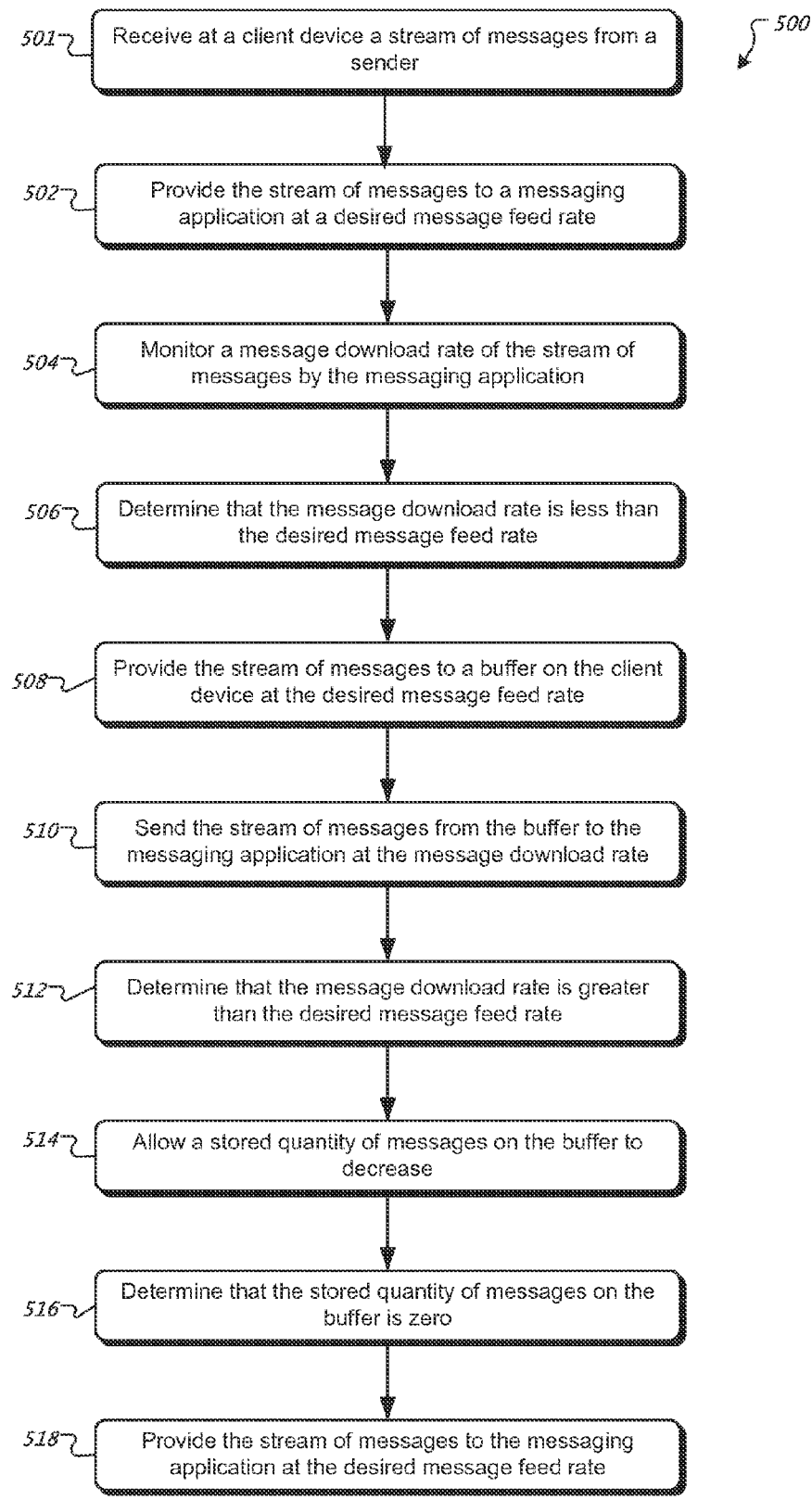
FIG. 5 is a flowchart of an example method for providing message data to a client device.

FIG. 5 is a flowchart of a method 500 of providing message data to a client device in accordance with certain examples. A stream of messages is received (step 501) at the client device from a sender (e.g., an MX node in a PubSub system). The stream of messages is provided (step 502) to a messaging application on the client device at a desired message feed rate associated with the sender. The desired message feed rate may be, for example, a rate at which messages are published in a PubSub system. A message download rate of the stream of messages by the messaging application is monitored (step 504). A determination is made (step 506) that the message download rate is less than the desired message feed rate. In response, the stream of messages is provided (step 508) to a buffer for the client device at the desired message feed rate, and the stream of messages is sent (step 510) from the buffer to the messaging application at the message download rate. A determination is made (step 512) that the message download rate is greater than the desired message feed rate and, in response, a stored quantity of messages on the buffer is allowed (step 514) to decrease. A determination is made (step 516) that the stored quantity of messages on the buffer is zero and, in response, the stream of messages is provided (step 518) to the messaging application at the desired message feed rate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    performing by one or more computers:
        receiving at a client device a stream of messages, the stream of messages comprising a message feed rate;
        determining a maximum download rate for a messaging application on the client device;
        determining that the message feed rate is less than or equal to the maximum download rate and, in response, providing the stream of messages to the messaging application at the message feed rate; and
        determining that the message feed rate is greater than the maximum download rate and, in response, providing the stream of messages to a buffer at the message feed rate, and providing the stream of messages from the buffer to the messaging application at a rate less than or equal to the maximum download rate.

2. The method of claim 1, wherein the buffer resides on the client device.

3. The method of claim 1, wherein the stream of messages corresponds to a single channel in a Pub Sub system.

4. The method of claim 1, wherein the stream of messages corresponds to a plurality of channels in a Pub Sub system.

5. The method of claim 1, wherein receiving the stream of messages at the client device comprises receiving messages from an MX node of a Pub Sub system.

6. The method of claim 1, wherein the message feed rate corresponds to a rate at which messages are published in a Pub Sub system.

7. The method of claim 1, further comprising preserving an order of messages in the stream of messages.

8. The method of claim 1, wherein determining that the message feed rate is greater than the maximum download rate comprises monitoring download capabilities of the messaging application and, based thereon, determining that the messaging application is unable to download the stream of messages at the message feed rate.

9. The method of claim 1, wherein providing the stream of messages from the buffer to the messaging application comprises accumulating messages in the buffer.

10. The method of claim 1, wherein providing the stream of message to the buffer comprises diverting the messages to the buffer.

11. The method of claim 1, wherein the stream of messages comprises a flow of message data.

12. The method of claim 1, wherein providing the stream of messages from the buffer to the messaging application comprises providing message data to the messaging application in an order in which the buffer received the message data.

13. A system comprising:
    one or more computers programmed to perform operations comprising:
        receiving at a client device a stream of messages, the stream of messages comprising a message feed rate;
        determining a maximum download rate for a messaging application on the client device;
        determining that the message feed rate is less than or equal to the maximum download rate and, in response, providing the stream of messages to the messaging application at the message feed rate; and
        determining that the message feed rate is greater than the maximum download rate and, in response, providing the stream of messages to a buffer at the message feed rate, and providing the stream of messages from the buffer to the messaging application at a rate less than or equal to the maximum download rate.

14. The system of claim 13, wherein the buffer resides on the client device.

15. The system of claim 13, wherein the stream of messages corresponds to a single channel in a Pub Sub system.

16. The system of claim 13, wherein the stream of messages corresponds to a plurality of channels in a Pub Sub system.

17. The system of claim 13, wherein receiving the stream of messages at the client device comprises receiving messages from an MX node of a Pub Sub system.

18. The system of claim 13, wherein the message feed rate corresponds to a rate at which messages are published in a Pub Sub system.

19. The system of claim 13, the operations further comprising preserving an order of messages in the stream of messages.

20. The system of claim 13, wherein determining that the message feed rate is greater than the maximum download rate comprises monitoring download capabilities of the messaging application and, based thereon, determining that the messaging application is unable to download the stream of messages at the message feed rate.

21. The system of claim 13, wherein providing the stream of messages from the buffer to the messaging application comprises accumulating messages in the buffer.

22. The system of claim 13, wherein providing the stream of message to the buffer comprises diverting the messages to the buffer.

23. The system of claim 13, wherein the stream of messages comprises a flow of message data.

24. The system of claim 13, wherein providing the stream of messages from the buffer to the messaging application comprises providing message data to the messaging application in an order in which the buffer received the message data.

25. A storage device having instructions stored thereon that when executed by one or more computers perform operations comprising:
- receiving at a client device a stream of messages, the stream of messages comprising a message feed rate;
- determining a maximum download rate for a messaging application on the client device;
- determining that the message feed rate is less than or equal to the maximum download rate and, in response, providing the stream of messages to the messaging application at the message feed rate; and
- determining that the message feed rate is greater than the maximum download rate and, in response, providing the stream of messages to a buffer at the message feed rate, and providing the stream of messages from the buffer to the messaging application at a rate less than or equal to the maximum download rate.

* * * * *